United States Patent
Gore et al.

(10) Patent No.: US 11,321,075 B1
(45) Date of Patent: May 3, 2022

(54) UPDATING A COMPUTING DEVICE OF AN INFORMATION HANDLING SYSTEM

(71) Applicant: Dell Products L.P., Round Rock, TX (US)

(72) Inventors: Santosh Hanamant Gore, Bangalore (IN); Raveendra Babu Madala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/141,884

(22) Filed: Jan. 5, 2021

(51) Int. Cl.
    G06F 8/654 (2018.01)
    G06F 11/14 (2006.01)
    G06F 9/4401 (2018.01)
    G06F 11/07 (2006.01)

(52) U.S. Cl.
    CPC ........... *G06F 8/654* (2018.02); *G06F 9/4401* (2013.01); *G06F 11/0754* (2013.01); *G06F 11/1417* (2013.01); *G06F 11/1438* (2013.01)

(58) Field of Classification Search
    CPC ......... G06F 8/60–66; G06F 21/57–577; G06F 9/4401; G06F 11/0754; G06F 11/1417; G06F 11/1438; G06F 11/1441
    USPC .................................................. 717/168–178
    See application file for complete search history.

(56) References Cited

U.S. PATENT DOCUMENTS

| | | | | |
|---|---|---|---|---|
| 7,467,378 B1 * | 12/2008 | Sobel | ................ | G06F 9/44505 717/168 |
| 7,516,450 B2 * | 4/2009 | Ogura | .................... | H04L 29/06 717/168 |
| 8,117,434 B2 * | 2/2012 | Sun | ..................... | G06F 11/1417 713/2 |
| 2004/0117609 A1 * | 6/2004 | Stalker | .............. | H04N 21/4334 713/2 |
| 2006/0168580 A1 * | 7/2006 | Harada | ................... | G06F 21/79 717/174 |
| 2012/0173859 A1 * | 7/2012 | Wang | .................... | G06F 9/4401 713/2 |
| 2015/0160994 A1 * | 6/2015 | Niwa | .................. | G06F 11/0778 714/19 |

(Continued)

OTHER PUBLICATIONS

"Reboot" entry, Wikipedia, 2019, 6 pages, [retrieved on Dec. 17, 2021], Retrieved from the Internet: <URL:https://web.archive.org/web/20190710073616/https://en.wikipedia.org/wiki/Reboot_(computing)>.*

(Continued)

*Primary Examiner* — Geoffrey R St Leger
(74) *Attorney, Agent, or Firm* — Baker Botts L.L.P.

(57) ABSTRACT

A system and a method of updating a computing device of an information handling system (IHS), including identifying a reboot of the IHS; determining whether the reboot of the IHS is classified as a normal reboot of the IHS or is classified as a failure-reboot of the IHS; when it is determined that the reboot of IHS is classified as a failure-reboot of the IHS: obtaining an activation time period of a scheduled update to the computing device; obtaining a current date and time of the IHS; determining whether the current date and time of the IHS is within the activation time period of the scheduled update to the computing device; and when it is determined that the current date and time is within the activation time period of the scheduled update, transferring update firmware to the computing device for activation at the computing device.

20 Claims, 4 Drawing Sheets

(56) References Cited

U.S. PATENT DOCUMENTS

| | | | | |
|---|---|---|---|---|
| 2016/0019048 A1* | 1/2016 | Tsuboi | ................... | G06F 3/123 |
| | | | | 717/168 |
| 2017/0115979 A1* | 4/2017 | Murthy | ................... | H04L 67/16 |
| 2020/0363855 A1* | 11/2020 | Basterash | ............. | G06F 9/4406 |

OTHER PUBLICATIONS

"Firmware" entry, Wikipedia, 2019, 7 pages, [retrieved on Dec. 17, 2021], Retrieved from the Internet: <URL:https://web.archive.org/web/20190430215501/https://en.wiki pedia.org/wiki/Firmware>.*

"Maintenance window" entry, Wikipedia, 2019, 2 pages, [retrieved on Dec. 17, 2021], Retrieved from the Internet: <URL:https://web.archive.org/web/20190311052739/https://en.wikipedia.org/wiki/Maintenance_window>.*

\* cited by examiner

UPDATING A COMPUTING DEVICE OF AN INFORMATION HANDLING SYSTEM

BACKGROUND

Field of the Disclosure

The disclosure relates generally to an information handling system, and in particular, updating a computing device of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To address and fix certain issues and for enhancing functionality of an information handling system, updates are provided from time to time to the information handling system. These issues can make the information handling system vulnerable to security attacks. Users can apply the updates such that the issues may not affect the information handling system. However, due to the growing computing needs and high availability requirements of the information handling system, system administrators would like to reduce the time it takes for updating the information handling system.

SUMMARY

Innovative aspects of the subject matter described in this specification may be embodied in method for updating a computing device of an information handling system, the method including identifying a reboot of the information handling system; determining whether the reboot of the information handling system is classified as a normal reboot of the information handling system or is classified as a failure-reboot of the information handling system; when it is determined that the reboot of the information handling system is classified as a failure-reboot of the information handling system: obtaining an activation time period of a scheduled update to the computing device; obtaining a current date and time of the information handling system; determining whether the current date and time of the information handling system is within the activation time period of the scheduled update to the computing device; and when it is determined that the current date and time is within the activation time period of the scheduled update, transferring update firmware to the computing device for activation at the computing device.

Other embodiments of these aspects include corresponding systems, apparatus, and computer programs, configured to perform the actions of the methods, encoded on computer storage devices.

These and other embodiments may each optionally include one or more of the following features. For instance, when it is determined that the current date and time is not within the activation time period, preventing transfer of the update firmware to the computing device to prevent activation of the update firmware at the computing device. When it is determined that the reboot of the information handling system is classified as a normal reboot of the information handling system, transferring the update firmware to the computing device for activation at the computing device. When it is determined that the current date and time is not within the activation time period: Determining whether activation of the update firmware is pending at the device, in response to determining that activation of the update firmware is pending at the device, preventing activation of the update firmware at the computing device. Receiving, at the computing device, the update firmware; and activating, at the computing device, the update firmware. Transferring the update firmware to the computing device further includes transmitting an OEM defined PCIe-VDM message to the computing device for activation of the update firmware at the computing device. Preventing transfer of the update firmware to the computing device to prevent activation of the update firmware at the computing device further includes transmitting an OEM defined PCIe-VDM message to the computing device to prevent activation of the update firmware at the computing device.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
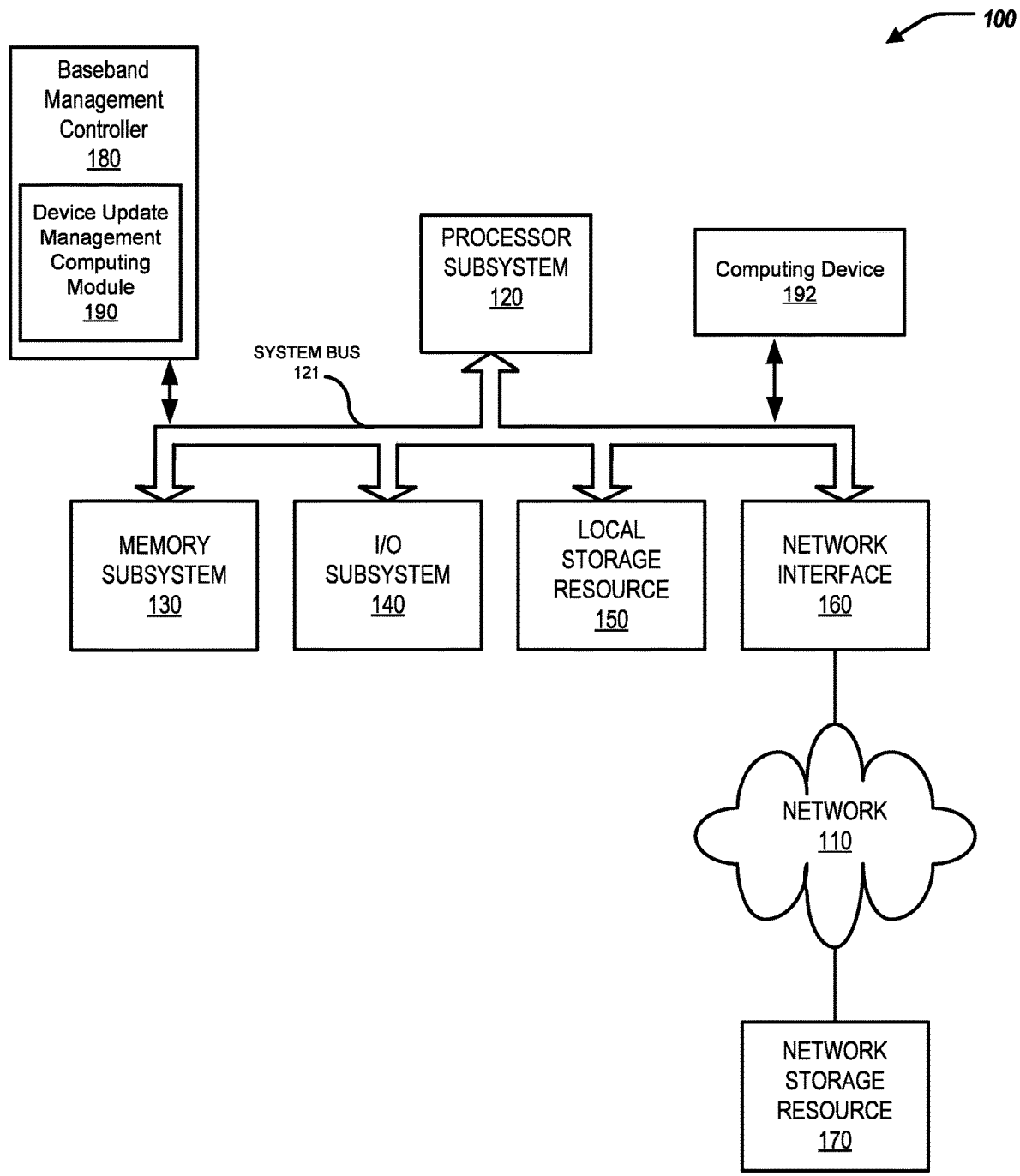
FIG. 1 is a block diagram of selected elements of an embodiment of an information handling system.

This disclosure discusses methods and systems for updating a computing device of an information handling system. In short, staged firmware updates to a computing device are typically applied when the information handling system reboots (i.e., power cycles). However, the information handling system may reboot due to unexpected failures, leading to an increase in the downtime of the information handling system, and may place the information handling system not in compliance to other information handling systems (e.g., of a server farm). To that end, the present disclosure discusses facilitating providing accurate updates to the computing device during reboots of the information handling system.

For example, if a failure-reboot of the information handling system is detected, the information handling system can ensure that the firmware update to a computing device (of the information handling system) is applied at an appropriate time based on a scheduling of the firmware update. This can prevent accidental activation of the firmware update to the computing device at unscheduled/unintended times; provides control of activation of the firmware update during the reboot process; provides activation of the firmware updates at desired times; avoids accidental updates to the computing device during system failure; and reduces downtime of the information handling system during system crash.

Specifically, this disclosure discusses a system and a method of updating a computing device of an information handling system, including identifying a reboot of the information handling system; determining whether the reboot of the information handling system is classified as a normal reboot of the information handling system or is classified as a failure-reboot of the information handling system; when it is determined that the reboot of the information handling system is classified as a failure-reboot of the information handling system: obtaining an activation time period of a scheduled update to the computing device; obtaining a current date and time of the information handling system; determining whether the current date and time of the information handling system is within the activation time period of the scheduled update to the computing device; and when it is determined that the current date and time is within the activation time period of the scheduled update, transferring update firmware to the computing device for activation at the computing device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a baseband management controller (BMC) 180. The BMC 180 can be in communication with the other components of the information handling system 100 via the system bus 121. The BMC 180 can include a device update management computing module 190. In some examples, the device update management computing module 190 can include a computer-executable program (software). The device update management computing module 190 can be executed by the processor subsystem 120. The information handling system 100 can further include a computing device 192. The computing device 192 can include any computing module or physical device associated with the information handling system 100. For example, the computing device 192 can include a peripheral component interconnect express (PCIe) computing device. The computing device 192 can be in communication with the other components of the information handling system 100 via the system bus 121.

In short, staged firmware updates to the computing device 192 are typically applied with the information handling system 100 reboots (power cycles). However, the information handling system 100 may reboot due to unexpected failures, leading to an increase in the downtime of the information handling system 100, and may not be in compliance to other information handling systems 100 (e.g., of a server farm). To that end, the information handling system 100, and the device update management computing module 190 can facilitate providing accurate updates to the computing device 192 during reboots of the information handling system 100.

For example, if a failure-reboot of the information handling system 100 is detected, the device update management computing module 190 can ensure that a firmware update to the computing device 192 is applied at an appropriate time based on a scheduling of the firmware update. This can prevent accidental activation of the firmware update to the computing device 192 at unscheduled/unintended times; provides control of activation of the firmware update during the reboot process; provides activation of the firmware updates at desired times; avoids accidental updates to the computing device 192 during system failure; and reduce downtime of the information handling system 100 during system crash.

Figure 2:
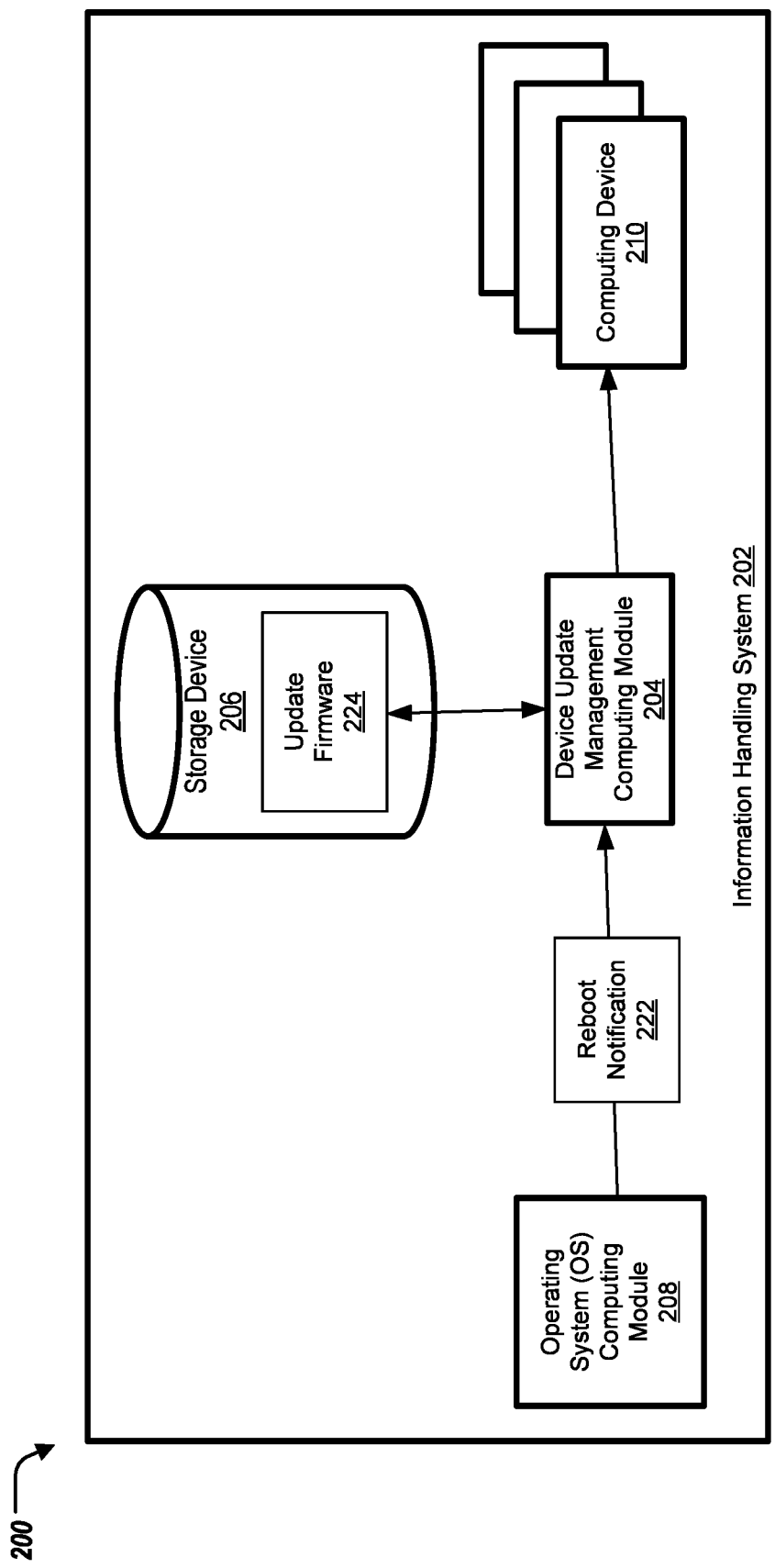
FIG. 2 illustrates a block diagram of an information handling system for updating a computing device of the information handling system.

Turning to FIG. 2, FIG. 2 illustrates an environment 200 including an information handling system 202. The information handling system 202 can include a device update management computing module 204, a storage device 206, an operating system (OS) computing module 208, and a computing device 210 (or computing devices 210). In some examples, the IHS 202 is similar to, or includes, the information handling system 100 of FIG. 1. In some examples, the device update management computing module 204 is the same, or substantially the same, as device update management computing module 190 of FIG. 1. In some examples, the computing device 210 is the same, or substantially the same, as the computing device 192 of FIG. 1.

The device update management computing module 204 can be in communication with the OS computing module 208, the storage device 206, and the computing device 210.

The OS computing module 208 facilitates execution of an operating system of the information handling system 202 (e.g., by the processor subsystem 120 of FIG. 1). The OS computing module 208 can include the OS, a portion of the OS, and/or data related to the OS.

The computing device 210 (or devices 210) can include any computing module or physical device associated with the information handling system 202. For example, the computing device 210 can include a peripheral component interconnect express (PCIe) computing device.

The device update management computing module 204 can include a baseboard management controller (BMC), or a remote access controller (out-of-band management platform) such as an integrated Dell Remote Access Controller (iDRAC).

The storage device 206 can store, or provide access to, update firmware 224. The update firmware 224 can be computer software that provides low-level control for the computing device 210.

Figure 3:
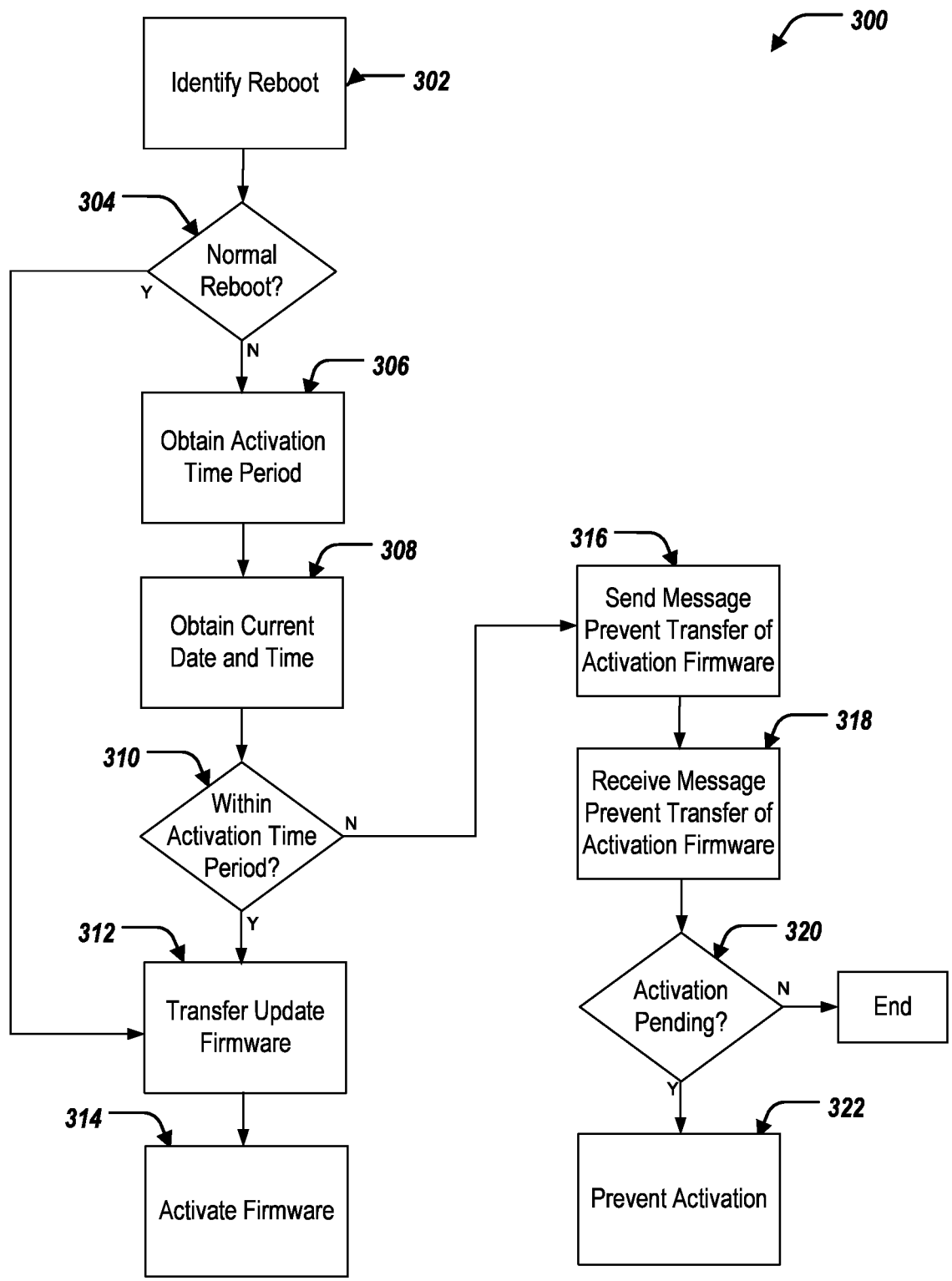
FIGS. 3 and 4 illustrates respective methods for updating a computing device of the information handling system.

FIG. 3 illustrates a flowchart depicting selected elements of an embodiment of a method 300 for updating the computing device 210. The method 300 may be performed by the information handling system 100, the information handling system 202 and/or the device update management computing module 204, and with reference to FIGS. 1-2. It is noted that certain operations described in method 300 may be optional or may be rearranged in different embodiments.

Specifically, the device update management computing module 204 can identify a reboot of the information handling system 202, at 302. That is, in some cases, the information handling system (IHS) 202 can be rebooted due to multiple, differing issues resulting in a failure-reboot. The IHS 202 can be rebooted due to failures such as device failure (e.g., by the computing device 210), a power outage of the IHS 202, and/or an operating system crash (e.g., a blue screen of death or BSOD). However, in some cases, the IHS 202 can be rebooted as normal, or as planned (i.e., not an "accidental" reboot or failure-reboot).

In some examples, the device update management computing module 204 can receive a reboot notification 222 from the OS computing module 208. The reboot notification 222 can indicate that, when there is a reboot of the IHS 202, a classification of the reboot—e.g., whether the reboot of the IHS 202 is classified as a normal reboot, or the reboot of the IHS 202 is classified as a failure-reboot. In some examples, the OS computing module 208 provides the reboot notification 222 automatically to the device update management computing module 204—e.g., in response to the reboot of the IHS 202. In some examples, the OS computing module 208 provides the reboot notification 222 in response to a request for such information by the device update management computing module 204—the device update management computing module 204 "fetches" the reboot notification 222 from the OS computing module 208.

In some examples, the device update management computing module 204 can include a watchdog timer to determine if there has been a reboot of the IHS 202. Specifically, the watchdog timer, when it "counts down" to a value of zero, will execute a predetermined action—e.g., determine that a reboot of the IHS 202 has occurred, such as a failure-reboot of the IHS 202. For example, when the IHS 202 is initialized, the watchdog timer can be set to an initial countdown value. At periodic intervals, when the IHS 202 is functioning nominally, the watchdog timer is reset, and thus, does not count down to zero. However, when there is a failure-reboot of the IHS 202, the watchdog timer is not reset by the IHS 202, and will count down to zero to indicate the failure-reboot of the IHS 202.

The device update management computing module 204 can determine whether the reboot of the IHS 202 is classified as the normal reboot of the IHS 202 or is classified as the failure-reboot of the IHS 202, at 304. That is, in response to the reboot notification 220, the device update management computing module 204 can determine whether the reboot of the IHS 202 is classified as the normal reboot of the IHS 202 or is classified as the failure-reboot of the IHS 202.

The device update management computing module 204 can determine that the reboot of the IHS 202 is classified as a failure-reboot of the IHS 202, and in response, obtain an activation time period of a scheduled update to the computing device 210, at 306. The device update management computing module 204 can further obtain a current date and time of the information handling system 202, at 308. The device update management computing module 204 can determine whether the current date and time of the IHS 202 is within the activation time period of the scheduled update to the computing device 210, at 310. For example, the time period of the scheduled update can be defined between a first time and a second time, with the device update management computing module 204 determining whether the current date and time of the IHS 202 is between the first time and the second time.

The device update management computing module 204, when it is determined that the current date and time is within the activation time period of the scheduled update, transfers the update firmware 224 to the computing device 210 for activation at the computing device 210, at 312. For example, the device update management computing module 204 determines that the current date and time of the IHS 202 is between the first time and the second time, and in response, transfers the update firmware 224 to the computing device 210 for activation at the computing device 210. In some examples, the device update management computing module 204, when it is determined that the current date and time is within the activation time period of the scheduled update, transfers the update firmware 224 to the computing device 210 for activation of the update firmware 224 at the computing device 210 by transmitting an OEM defined PCIe-VDM message to the computing device 210 for activation of the update firmware 224 at the computing device 210.

The computing device 210 can receive the update firmware 224, and activate the update firmware 224, at 314.

In some examples, the device update management computing module 204, when it is determined that the current date and time is not within the activation time period of the scheduled update, prevents transfer of the update firmware 224 to the computing device 210 to prevent activation of the update firmware 224 at the computing device 210, at 316. For example, the device update management computing module 204 determines that the current date and time of the IHS 202 is not between the first time and the second time, and in response, prevents transfer of the update firmware 224 to the computing device 210 to prevent activation of the update firmware 224 at the computing device 210. In some examples, the device update management computing module 204, when it is determined that the current date and time is not within the activation time period of the scheduled update, prevents transfer of the update firmware 224 to the computing device 210 to prevent activation of the update firmware 224 at the computing device 210 by transmitting an OEM defined PCIe-VDM message to the computing device 210 to prevent activation of the update firmware 224 at the computing device 210.

In some cases, the update firmware 224 is a staged update to the computing device 210. Specifically, the computing device 210 can receive the message from the device update management computing module 204 to prevent activation of the update firmware 224 at the computing device 210, at 318. The computing device 210 can determine whether activation of the update firmware 224 is pending at the computing device 210, at 320. That is, in response to the message from the device update management computing module 204 to prevent activation of the update firmware 224 at the computing device 210, the computing device 210 can determine whether activation of the update firmware 224 is pending at the computing device 210. For example, the computing device 310 had previously received the update firmware 224. In some examples, the computing device 210 can determine whether activation of any portion or stage of the update firmware 224 is pending at the computing device 210.

The computing device 210 can determine that activation of the update firmware 224 is pending at the computing device 210, and in response, prevent activation of the update firmware 224 at the computing device 210, at 322. That is, the computing device 210 can prevent activation of any portion of stage of the update firmware 224 at the computing device 210. The computing device 210 can determine that activation of the update firmware 224 is not pending at the computing device 210, and in response, the method 300 ends.

In some examples, the device update management computing module 204 can determine that the reboot of the IHS 202 is classified as a normal reboot of the IHS 202, and in response, transfer the update firmware 224 to the computing device 210 for activation at the computing device 210, at 312.

Figure 4:
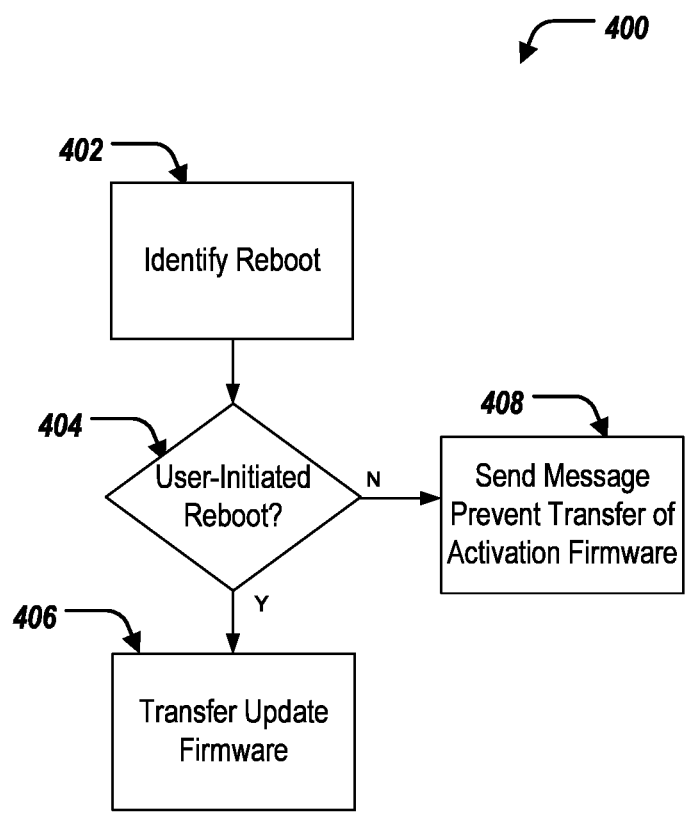

FIG. 4 illustrates a flowchart depicting selected elements of an embodiment of a method 400 for updating the computing device 210. The method 400 may be performed by the information handling system 100, the information handling system 202 and/or the device update management computing module 204, and with reference to FIGS. 1-2. It is noted that certain operations described in method 400 may be optional or may be rearranged in different embodiments.

Specifically, the device update management computing module 204 can identify a reboot of the information handling system 202, at 402. In some cases, a user of the IHS 202 can initiate the reboot of the IHS 202. That is, the user of the IHS 202 can initiate the reboot of the IHS 202 to indicate that the reboot is an "Activate Update and Reboot." Specifically, when the user of the IHS 202 indicates that the reboot of the IHS 202 is an "Activate Update and Reboot," the IHS 202, and in particular, the device update management computing module 204, can apply the update firmware 224 to the computing device 210, described further herein.

In some examples, the device update management computing module 204 can receive the reboot notification 222 from the OS computing module 208. The reboot notification 222 can indicate that, when there is a reboot of the IHS 202, a classification of the reboot—e.g., whether the reboot of the IHS 202 is user-initiated—an "Activate Update and Reboot."

The device update management computing module 204 can determine if the reboot of the IHS 202 is classified as an user-initiated reboot, at 404. That is, in response to the reboot notification 222, the device update management computing module 204 can determine whether the reboot of the IHS 202 is an user-initiated reboot to activate the firmware update 224 of the computing device 210.

The device update management computing module 204, when it is determined that the reboot of the IHS 202 is an user-initiated reboot to activate the firmware update 224 of the computing device 210 ("Activate Update and Reboot"), transfers the update firmware 224 to the computing device 210 for activation at the computing device 210, at 406. In some examples, the device update management computing module 204, when it is determined that the reboot of the IHS 202 is an user-initiated reboot to activate the firmware update 224 of the computing device 210 ("Activate Update and Reboot"), transfers the update firmware 224 to the computing device 210 for activation of the update firmware 224 at the computing device 210 by transmitting an OEM defined PCIe-VDM message to the computing device 210 for activation of the update firmware 224 at the computing device 210.

In some examples, the device update management computing module 204, when it is determined that the reboot of the IHS 202 is not an user-initiated reboot to activate the firmware update 224 of the computing device 210 ("Activate Update and Reboot"), prevents transfer of the update firmware 224 to the computing device 210 to prevent activation of the update firmware 224 at the computing device 210, at 408. In some examples, the device update management computing module 204, when it is determined that the reboot of the IHS 202 is not an user-initiated reboot to activate the firmware update 224 of the computing device 210 ("Activate Update and Reboot"), prevents transfer of the update firmware 224 to the computing device 210 to prevent activation of the update firmware 224 at the computing device 210 by transmitting an OEM defined PCIe-VDM message to the computing device 210 to prevent activation of the update firmware 224 at the computing device 210.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of updating a computing device of an information handling system, the method comprising:
    identifying a reboot of the information handling system;
    determining whether the reboot of the information handling system is classified as a normal reboot of the information handling system or is classified as a failure-reboot of the information handling system;
    when it is determined that the reboot of the information handling system is classified as a failure-reboot of the information handling system:
        i) obtaining an activation time period of a scheduled update to the computing device;
        ii) obtaining a current date and time of the information handling system;
        iii) determining whether the current date and time of the information handling system is within the activation time period of the scheduled update to the computing device; and
        iv) when it is determined that the current date and time is within the activation time period of the scheduled update, transferring update firmware to the computing device for activation at the computing device.

2. The computer-implemented method of claim 1, when it is determined that the current date and time is not within the activation time period, preventing transfer of the update firmware to the computing device to prevent activation of the update firmware at the computing device.

3. The computer-implemented method of claim 2, wherein preventing transfer of the update firmware to the computing device to prevent activation of the update firmware at the computing device further includes transmitting an OEM defined PCIe-VDM message to the computing device to prevent activation of the update firmware at the computing device.

4. The computer-implemented method of claim 1, when it is determined that the reboot of the information handling system is classified as a normal reboot of the information handling system, transferring the update firmware to the computing device for activation at the computing device.

5. The computer-implemented method of claim 1, when it is determined that the current date and time is not within the activation time period:
    determining whether activation of the update firmware is pending at the computing device,
    in response to determining that activation of the update firmware is pending at the computing device, preventing activation of the update firmware at the computing device.

6. The computer-implemented method of claim 1, further comprising:
    receiving, at the computing device, the update firmware; and
    activating, at the computing device, the update firmware.

7. The computer-implemented method of claim 1, wherein transferring the update firmware to the computing device further includes transmitting an OEM defined PCIe-VDM message to the computing device for activation of the update firmware at the computing device.

8. An information handling system comprising a processor having access to memory media storing instructions executable by the processor to perform operations comprising:
    identifying a reboot of an information handling system;
    determining whether the reboot of the information handling system is classified as a normal reboot of the information handling system or is classified as a failure-reboot of the information handling system;
    when it is determined that the reboot of the information handling system is classified as a failure-reboot of the information handling system:
        i) obtaining an activation time period of a scheduled update to a computing device of the information handling system;
        ii) obtaining a current date and time of the information handling system;
        iii) determining whether the current date and time of the information handling system is within the activation time period of the scheduled update to the computing device; and
        iv) when it is determined that the current date and time is within the activation time period of the scheduled update, transferring update firmware to the computing device for activation at the computing device.

9. The system of claim 8, when it is determined that the current date and time is not within the activation time period, the operations further comprise preventing transfer of the update firmware to the computing device to prevent activation of the update firmware at the computing device.

10. The system of claim 9, wherein preventing transfer of the update firmware to the computing device to prevent activation of the update firmware at the computing device further includes transmitting an OEM defined PCIe-VDM message to the computing device to prevent activation of the update firmware at the computing device.

11. The system of claim 8, when it is determined that the reboot of the information handling system is classified as a normal reboot of the information handling system, the operations further comprise transferring the update firmware to the computing device for activation at the computing device.

12. The system of claim 8, when it is determined that the current date and time is not within the activation time period, the operations further comprise:
    determining whether activation of the update firmware is pending at the computing device,
    in response to determining that activation of the update firmware is pending at the computing device, preventing activation of the update firmware at the computing device.

13. The system of claim 8, the operations further comprise:
    receiving, at the computing device, the update firmware; and
    activating, at the computing device, the update firmware.

14. The system of claim 8, wherein transferring the update firmware to the computing device further includes transmitting an OEM defined PCIe-VDM message to the computing device for activation of the update firmware at the computing device.

15. A non-transitory computer-readable medium storing software comprising instructions executable by one or more computers which, upon such execution, cause the one or more computers to perform operations comprising:

identifying a reboot of an information handling system;

determining whether the reboot of the information handling system is classified as a normal reboot of the information handling system or is classified as a failure-reboot of the information handling system;

when it is determined that the reboot of the information handling system is classified as a failure-reboot of the information handling system:

i) obtaining an activation time period of a scheduled update to a computing device of the information handling system;

ii) obtaining a current date and time of the information handling system;

iii) determining whether the current date and time of the information handling system is within the activation time period of the scheduled update to the computing device; and iv) when it is determined that the current date and time is within the activation time period of the scheduled update, transferring update firmware to the computing device for activation at the computing device.

16. The computer-readable medium of claim 15, when it is determined that the current date and time is not within the activation time period, the operations further comprise preventing transfer of the update firmware to the computing device to prevent activation of the update firmware at the computing device.

17. The computer-readable medium of claim 15, when it is determined that the reboot of the information handling system is classified as a normal reboot of the information handling system, the operations further comprise transferring the update firmware to the computing device for activation at the computing device.

18. The computer-readable medium of claim 15, when it is determined that the current date and time is not within the activation time period, the operations further comprise:

determining whether activation of the update firmware is pending at the computing device, in response to determining that activation of the update firmware is pending at the computing device, preventing activation of the update firmware at the computing device.

19. The computer-readable medium of claim 15, the operations further comprise:

receiving, at the computing device, the update firmware; and activating, at the computing device, the update firmware.

20. The computer-readable medium of claim 15, wherein transferring the update firmware to the computing device further includes transmitting an OEM defined PCIe-VDM message to the computing device for activation of the update firmware at the computing device.

\* \* \* \* \*